United States Patent [19]

Höppener

[11] Patent Number: 5,438,089

[45] Date of Patent: Aug. 1, 1995

[54] PROCESS FOR THE MANUFACTURE OF POLYMERIC OBJECTS STARTING FROM A SOLUTION

[75] Inventor: Roderik H. Höppener, Maastricht, Netherlands

[73] Assignee: DSM N.V., Netherlands

[21] Appl. No.: 165,854

[22] Filed: Dec. 14, 1993

[30] Foreign Application Priority Data

Dec. 21, 1992 [BE] Belgium .............................. 9201116

[51] Int. Cl.$^6$ ........................... D01F 6/04; C08K 5/01; C08L 23/06
[52] U.S. Cl. ................................. 524/487; 524/543; 524/848; 264/205; 264/290.5; 57/362
[58] Field of Search .................... 524/487, 543, 848; 264/290.5, 205; 57/362

[56] References Cited

U.S. PATENT DOCUMENTS

| | | | |
|---|---|---|---|
| 3,454,526 | 7/1969 | Rellensmann et al. | 523/331 |
| 4,344,908 | 8/1982 | Smith et al. | 264/203 |
| 4,422,993 | 12/1983 | Smith et al. | 264/210.8 |
| 4,430,383 | 2/1984 | Smith et al. | 428/364 |
| 4,603,194 | 7/1986 | Mendiratta et al. | 528/501 |
| 4,620,955 | 11/1986 | Kono et al. | 264/41 |
| 5,068,073 | 11/1991 | Pennings et al. | 264/211.15 |
| 5,128,415 | 7/1992 | Bastiaanses et al. | 525/240 |

*Primary Examiner*—Paul R. Michl
*Assistant Examiner*—Andrew E. C. Merriam
*Attorney, Agent, or Firm*—Cushman Darby & Cushman

[57] ABSTRACT

Process for the manufacture of a polymeric object starting from a solution of a polymer in a solvent and comprising drawing a solvent-containing polymeric object, the solvent containing a first and a second component, the first component being more volatile than the second one and drawing being effected in the presence of the second component after removal of the first component, and a solution of a spinable polymer in a solvent containing two components, one of the components being more volatile than the other.

9 Claims, No Drawings

PROCESS FOR THE MANUFACTURE OF POLYMERIC OBJECTS STARTING FROM A SOLUTION

The invention relates to a process for the manufacture of a polymeric object starting from a solution of the polymer in a solvent.

Such a process is disclosed in EP-160,551, wherein a solution of polyethylene in a non-volatile solvent, paraffin wax, is extruded into a film, which is subsequently cooled down to below the solution temperature, freed of a proportion of the paraffin wax by extraction, drawn, and, lastly, freed of the remaining wax. The properties, in particular the porosity, of the polymer film ultimately obtained can be influenced by the choice of the amount of solvent to be removed in the first extraction step.

It is a disadvantage of this known process that the amount of solvent to be removed in the first extraction step and, thus, the porosity of the ultimate film, is difficult to control.

The process according to the invention aims to substantially eliminate this disadvantage.

This object is achieved according to the invention in that the solvent contains a first and a second component, the first component being more volatile than the second one.

Utilizing the difference in volatility between the two components, both of which are solvents for the polymer, it is generally possible to remove the first component under conditions under which the second component is not removed in any significant amount. On removal of the first component, what remains in the object is the second component, whose quantity is accurately known from the composition of the original solution. Consequently, the downstream operations, by which are meant the steps carried out following the removal of the first component, can be carried out in the presence of an amount of solvent in the object which is markedly better defined than in the known process. A downstream operation commonly applied is drawing.

From GB-A-2,051,667 it is known to spin a solution, also one of polyethylene, in a volatile solvent to obtain a solvent-containing gel fibre and to draw the fibre on partial evaporation of the solvent, in which process another portion of the solvent may optionally evaporate, and then to remove the remaining solvent. A disadvantage of this process is that volatile organic solvent is released throughout the process. This calls for elaborate environmental and safety measures to prevent solvent vapours from being released in the area. In a preferred embodiment of the process according to the invention this is prevented by selecting a second solvent component which does not volatilize or which volatilizes only to an acceptably small extent under the conditions of the downstream operations.

This preferred embodiment of the process according to the invention offers major advantages especially in a drawing operation, which almost always takes place in large installations, which are difficult to seal from the area. An added advantage of this preferred embodiment is that the second, less volatile component hardly evaporates, if at all, during drawing so that only very little heat, if any, is extracted from the object through evaporation of the solvent so that it is easier to keep the object at the high and uniform temperature generally needed for drawing.

The polymers used in the process according to the invention may be those polymers of which processable, especially spinable or extrudable, solutions can be prepared, hereafter referred to as film-forming polymers. Examples hereof are polyalkenes, alkene copolymers, polyketones, polyacrylonitrile, polyvinylalcohol and ethylenevinylalcohol.

Suitable solvents for polyalkenes, in particular polyethylene, polypropylene or copolymers thereof with a minor amount, say up to 5%, of higher alkenes are, for instance, paraffins (>300° C., 17 or more C atoms), paraffin oil (230°–300° C.), mineral oil (150°–300° C.), toluene (110° C.), xylene (138°–144° C.), alkanes with 9–12 C atoms (151°–216° C.), Tetralin (206° C.) or Decalin (187°–196° C.) and for polyvinylalcohol for instance ethylene glycol (>300° C.), glycerine (290° C.), diethylenetriamine (107° C.), ethylenediamine (116° C.) or dimethylsulphoxide (189° C.). The values given between brackets are the boiling points of the various solvents.

As first component use is preferably made of a solvent whose boiling point under atmospheric conditions is below 225° C. Preferably, this boiling point is below 215° C., more preferably below 200° C. As second component use is preferably made of a solvent whose boiling point is at least 15° C., preferably 25° C., more preferably at least 35° C. higher than the boiling point of the first, more volatile component used. As a result, under the same conditions, the second component exhibits a markedly lower rate of evaporation than the first, more volatile component. Preferably, the first component is miscible with the second component at the temperature at which the solution is prepared and processed, so that a homogeneous solution can be obtained. In general, the lowest temperature at which the polymer dissolves in the first component will be lower than that at which the polymer dissolves in the second component. Preferably, the lowest temperature at which the polymer dissolves in either of the two components or in the mixture is below the temperature at which the solution is prepared and processed. The usual additives such as stabilizers, dispersants, colourants and the like may be added to the solution. In the solution may also be dispersed fillers that do not dissolve in either of the two components, for instance inorganic fillers, so that the process according to the invention may be employed with the aforementioned advantages to produce, for instance, filled objects.

Before any downstream operations are carried out in which the presence of a defined amount of solvent is desired it is necessary to remove the first component from the object under conditions under which the second component is removed from the object only to a negligible degree, if at all. It is preferred for such removal to be effected through evaporation, it being possible to utilize with advantage the difference in volatility between the first and the second component. This difference in volatility is determined in large part by the difference in boiling point between the first and the second component. Therefore, this difference in boiling point is preferably chosen to be at least 15° C., preferably at least 25° C., more preferably at least 35° C. Suitable solvents may be selected from the solvents for a particular polymer that are known per se, for instance from 'Polymer Handbook' by J. Brandrup and E. H. Immergut, third edition, chapter VII, pages 379–402. If a polyalkene or polyvinyl alcohol is used as polymer, suitable combinations of solvents are preferably chosen from the solvents mentioned earlier together with their boiling points. The polymer concentration in the solution is so chosen as to obtain a solution whose viscosity enables it to be processed to the desired object using known techniques such as spinning or extrusion. Using what is taught in, for instance, the aforementioned EP-A-160,551 and GB-A-2,051,667, it will be easy for one skilled in the art to make a proper choice of the concentration, taking account of the molecular weight of the polymer.

The ratio of the polymer to the second component preferably is between 9:1 and 4:1 except that if a non-soluble filler is present in the solution this ratio preferably is between 9:1 and 1:15. It has been found that in the latter case, at ratios of between 1:1.5 and 1:15, objects with a relatively low porosity of about 45–60% are obtained and that at ratios of between 9:1 and 1:1 objects with higher porosities, up to about 75% are obtained. It is noted that at ratios of the polymer to the second, non-volatile component of 1: (4 and more than 4) the object, on removal of the first component, often remains sticky. The viscosity of the solutions decreases at ratios of 1: (5 and more than 5) so that these solutions are not well processable in an extruder. These solutions can, however, be processed into film by pouring them onto a flat plate or roll. From the above it follows that ratios of between 1:1.5 and 1:4 are eminently suitable for the manufacture of filled films.

Drawing, if applied as a downstream operation, may be effected either uniaxially, in the case of fibres, films and tapes, or biaxially, especially in the case of films. The most favourable draw ratios and drawing conditions for various combinations of polymers and second components are known to, or easy to determine through experiment by, one skilled in the art. The drawing temperature and the rate of drawing are important parameters. For the combination of polyethylene-paraffin, for instance, this information may be found in the aforementioned EP-A-160,551 and for polyvinyl alcoholethylene glycol in U.S. Pat. No. 4,812,277. Other possible downstream operations include heat treatments, irradiation with UV light or electrons and other known operations designed to impart certain desired properties to the object. The presence of a solvent is often undesirable in these operations. As a case presents itself, one skilled in the art will be able to determine at what point in the process the second solvent should be removed also, for instance during or after drawing. Depending on its volatility, the second component may be removed through evaporation or, if a low-volatile second component is applied, through extraction. In the latter, preferred case, the first component is preferably used as extraction agent. This is possible for instance if the second component dissolves in the first component or mixes with the first component to form a homogeneous mixture at a temperature at which the polymer does not yet dissolve in the first component. An advantage of this embodiment is that no extra compound is introduced into the process through the extraction, which is advantageous in the recovery and purification of the solvents used.

The invention is elucidated by the following examples without being limited thereto. The quantities stated have been determined in the manner described below.

The thickness of the drawn films is determined through Scanning Electron Microscopy.

The density of the film is determined by determining the weight of a piece of film of known volume. The volume porosity is determined from the measured density $\rho$ and the density of the polymeric bulk material $\rho_0$ as follows:

$$\text{porosity} = \frac{\rho_0 - \rho}{\rho_0} \times 100\%$$

The tensile strength and the modulus are determined in accordance with ASTM Standard D882 on the basis of the full cross-section of the test piece.

The loss on ignition (LOI) is determined thermogravimetrically in air at a maximum temperature of 700° C.

Example I

To 50 parts by volume of Decalin were added 30 parts by volume of paraffin oil (Shell Ondina 68$^R$) and 20 parts by volume of polyethylene with an intrinsic viscosity IV, measured in Decalin at 135° C., of 15 dl/g. The polyethylene was dissolved in the decaline-paraffin mixture at 180° C. The solution was extruded through a flat-film die, also at 180° C., the extrudate being cooled by passing it through a water bath. The Decalin was removed from the film so formed by evaporation at 80° C., the paraffin remaining in the film. The paraffin oil-containing film was drawn biaxially, the temperature during drawing being increased from 100° to 140° C. After drawing of the film, the paraffin oil was extracted from the film in heptane and the film was dried. The procedure described was carried out with various draw ratios. The drawn and dried film possessed the properties given in Table 1.

TABLE 1

| Biaxial draw ratio | Thickness μm | Porosity Vol. % | Strength MPa | Modulus MPa |
|---|---|---|---|---|
| 4.6 × 6 | 4.1 | 45 | 16 | 27 |
| 7 × 9 | 2.5 | 81 | 36 | 97 |

Example II

Example 1 was repeated except that the paraffin oil was replaced by a paraffin wax with a weight average molecular weight of 1100 g/cm$^3$. The porosity at the same draw ratios as in Example I was 48 and 84%; the other results, too, were similar to those of Example 1.

Example III 10 parts by volume of polyethylene (PE) with an IV of 15 dl/g are added to a suspension of 15 parts by volume of finely dispersed Al$_2$O$_3$ in 90 parts by volume of solvent. Biaxially drawn films with a draw ratio of 6×6 are prepared at 130° C. in accordance with the procedure described in Example I. Different mixtures of Decalin and paraffin oil are successively used as solvent. The ratio of the two components is so chosen that on removal of the Decalin, that is, during drawing, the polyethylene: paraffin oil ratio has a particular, desired value as given in Table 2.

After the paraffin oil had been extracted the porosity was determined and the surface of the film was assessed. The results are given in Table 2.

TABLE 2

| PE:paraffin | Porosity % | Surface |
|---|---|---|
| 1:0* | 71 | dry |

TABLE 2-continued

| PE:paraffin | Porosity % | Surface |
| --- | --- | --- |
| 1:0.2 | 75 | dry |
| 1:1.1 | 67 | dry |
| 1:2 | 50 | dry |
| 1:4 | 55 | dry |
| 1:6 | 55 | sticky |
| 1:12 | 54 | sticky |

*For comparison, without paraffin oil

A transition in the porosity of the drawn, filled film is clearly located between the PE:paraffin ratios of 1:1.1 and 1:2. The transition from a dry to a sticky film surface is located between 1:4 and 1:6.

Example IV

A filled film with the following composition is prepared by the method set out in Example III: Filler:-polyethylene:paraffin oil:Decalin=15:10:25:90 (parts by volume). On one occasion $BaTiO_3$ is used as filler and on another occasion PMN (an oxide of lead, magnesium and niobium). On drawing and removal of solvent, the films have the following properties.

| filler | PMN | $BaTiO_3$ |
| --- | --- | --- |
| weight of filler/m$^2$(g) | 3.1 | 3.8 |
| thickness (μm) | 13 | 20 |
| porosity (%) | 49 | 46 |
| modulus (MPa) | 220 | 170 |
| tensile strength (MPa) | 38 | 33 |
| LOI (wt. %) | 8.2 | 10.3 |
| shrinkage at 80° C. (%) | <1 | — |

I claim:

1. A process for manufacture of an object comprising providing a solvent-containing polymeric object wherein the solvent is comprised of a first and a second component wherein the first component is more volatile than the second component; shaping the solvent-containing polymeric object; removing the first component from said solvent-containing polymeric object; and drawing the polymeric object in the presence of the second component.

2. A process according to claim 1, wherein the boiling point of the first component is at least 20° C. below the boiling point of the second component.

3. A process according to claim 1, wherein the polymer is a polyalkene and wherein that first component is selected from the group consisting of decahydronaphthalene, tetrahydronaphthalene and xylene.

4. A process according to claim 3, wherein said polyalkene is a polyethylene having an intrinsic viscosity of at least 4 dl/g.

5. A process according to claim 1, wherein said second component is selected from the group consisting of paraffin oil, paraffin wax and mineral oil.

6. A process according to claim 2, wherein said second component is selected from the group consisting of paraffin oil, paraffin wax and mineral oil.

7. A process according to claim 1, wherein the polymer is a polyalkene, the first component is selected from the group consisting of decahydronaphthalene, tetrahydronaphthalene and xylene, and said second component is selected from the group consisting of paraffin oil, paraffin wax and mineral oil.

8. process according to claim 7, wherein said polyalkene is a polyethylene having an intrinsic viscosity of at least 4 dl/g.

9. A process according to claim 1 wherein the shaping involves spinning to form a solvent-containing fiber or filament.

* * * * *